United States Patent
Anthony et al.

(10) Patent No.: US 12,504,744 B2
(45) Date of Patent: Dec. 23, 2025

(54) LOCAL UPDATE FROM GLOBAL CATALOG OF DEVICE AND SYSTEM ATTRIBUTES

(71) Applicant: Rockwell Automation Technologies, Inc., Mayfield Heights, OH (US)

(72) Inventors: Michael J. Anthony, Milwaukee, WI (US); Taryl J. Jasper, South Euclid, OH (US); Charles Rischar, Chardon, OH (US); Roman Vitek, Prague (CZ); Jonathan A. Mills, Mayfield Heights, OH (US); Nathaniel S. Sandler, Cleveland, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 131 days.

(21) Appl. No.: 18/342,488

(22) Filed: Jun. 27, 2023

(65) Prior Publication Data

US 2025/0004452 A1    Jan. 2, 2025

(51) Int. Cl.
*G05B 19/418* (2006.01)
*H04L 67/06* (2022.01)
*H04L 67/10* (2022.01)

(52) U.S. Cl.
CPC ..... *G05B 19/4185* (2013.01); *G05B 19/4183* (2013.01); *H04L 67/06* (2013.01); *H04L 67/10* (2013.01)

(58) Field of Classification Search
CPC ..... H04L 67/06; H04L 67/10; G05B 19/4183; G05B 19/4185
USPC ........................................................ 709/203
See application file for complete search history.

(56) References Cited

U.S. PATENT DOCUMENTS

| | | | | |
|---|---|---|---|---|
| 6,185,613 B1* | 2/2001 | Lawson | ................ | H04L 67/306 709/224 |
| 11,057,264 B1* | 7/2021 | Ghare | ................ | H04L 41/0895 |
| 2009/0276771 A1* | 11/2009 | Nickolov | ................ | H04L 67/34 718/1 |
| 2010/0235614 A1* | 9/2010 | Callaghan | .............. | G05B 19/05 713/1 |
| 2011/0153697 A1* | 6/2011 | Nickolov | .............. | G06F 9/5072 707/827 |
| 2020/0349033 A1* | 11/2020 | Chopra | ................ | G06F 11/1464 |
| 2021/0026561 A1* | 1/2021 | Ginzburg | .............. | G06F 3/0659 |

(Continued)

OTHER PUBLICATIONS

Geitgey, Natural Language Processing is Fun, Jul. 18, 2018, Medium (28 pages) (Year: 2018).*

(Continued)

*Primary Examiner* — Wing F Chan
*Assistant Examiner* — Leon Y Tseng

(57) ABSTRACT

Systems and methods are disclosed for performing a local update from a global catalog of device and system attributes. In certain embodiments, a system may comprise an edge server of an industrial automation environment, configured to update a local catalog from a cloud-based global catalog. The edge server may perform a device discovery operation to identify an industrial device connected to a local network on premises with the edge server, access the global catalog to obtain data about the industrial device, store the data about the industrial device to the local catalog, and respond to a query about the industrial device based on the data about the industrial device from the local catalog.

20 Claims, 5 Drawing Sheets

(56) References Cited

U.S. PATENT DOCUMENTS

| | | | |
|---|---|---|---|
| 2021/0056125 A1* | 2/2021 | Bar Oz | G06F 16/25 |
| 2022/0129426 A1* | 4/2022 | Sohail | G06F 16/215 |
| 2022/0244934 A1* | 8/2022 | Chen | G06F 11/3409 |

OTHER PUBLICATIONS

Brooks, EtherNet IP White Paper, Oct. 2001, Rockwell Automation (12 pages) (Year: 2001).*

* cited by examiner

LOCAL UPDATE FROM GLOBAL CATALOG OF DEVICE AND SYSTEM ATTRIBUTES

TECHNICAL FIELD

Various embodiments of the present technology relate to industrial automation systems, and particularly to the management of repositories of device, system, and software attributes and associated data.

BACKGROUND

Industrial automation environments, such as factories, mills, and the like, employ various devices, drives, machinery, and other components to perform industrial processes. Controllers and processors can automate various industrial systems and associated processes. Applications may be executed by controllers, implemented by industrial devices, or run on user devices to control, manage, and integrate the assets within an industrial environment. Applications of all kinds, including traditional software, cloud-based, and mobile may all use data to inform them how they go about interacting with devices, components, and software they are interoperable with.

Owners of industrial assets often reference electronic product catalogs, databases, or repositories containing information about industrial devices. The catalogs may include information about device, system, or software attributes, properties, profiles, schematics, etc. These details may be used to understand how applications interact with these devices, systems, and software components. Some industrial design platforms for developing industrial control projects—e.g., industrial control programming, device configurations, etc.—may utilize an integrated library of device files (e.g., electronic data sheet, or EDS, files) used for incorporating devices and software into an industrial automation system, and ensuring the components can interface properly. For example, these device files can assist in development of a control project by automatically generating device configurations or control programming for the represented device, or providing the developer with interfaces for setting the device's configuration parameters. All potentially useful device files can be pre-loaded to devices or applications. However, this amount of content can be enormous and impractical to provide for all of these applications, and the information may become outdated and incomplete with the passage of time.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Systems, devices, and methods are presented herein for performing a local update at an industrial automation environment from a global catalog of device and system attributes. An on-premises edge server of an industrial automation environment may be configured to determine devices, systems, and applications within the automation system, and retrieve relevant device details from a cloud-based global catalog to store in a local catalog. The edge server can then provide the relevant files to the local devices and applications. The edge server may further obtain relevant updates, patches, etc. from the global catalog. In some examples, the edge server may also monitor activities or queries from the local system, e.g., using natural language processing, and determine whether relevant information is available in the local catalog or should be retrieved from the global catalog.

In certain embodiments, a system may comprise an edge server of an industrial automation environment, configured to update a local catalog from a cloud-based global catalog. The edge server may perform a device discovery operation to identify an industrial device connected to a local network on premises with the edge server, access the global catalog to obtain data about the industrial device, store the data about the industrial device to the local catalog, and respond to a query about the industrial device based on the data about the industrial device from the local catalog.

In certain embodiments, a method may comprise updating a local catalog from a cloud-based global catalog via an edge server of an industrial automation environment, including performing a device discovery operation to identify an industrial device connected to a local network on premises with the edge server, accessing the global catalog to obtain data about the industrial device, storing the data about the industrial device to the local catalog, and responding to a query about the industrial device based on the data about the industrial device from the local catalog.

In certain embodiments, a memory device may store instructions that, when executed, cause a processor to perform a method comprising updating a local catalog from a cloud-based global catalog via an edge server of an industrial automation environment, including performing a device discovery operation to identify an industrial device connected to a local network on premises with the edge server, in response to identifying the industrial device during the device discovery operation, accessing the local catalog to determine whether data about the industrial device is already stored in the local catalog, accessing the global catalog to obtain the data about the industrial device based on the data about the industrial device not being stored in the local catalog, storing the data about the industrial device to the local catalog, and responding to a query about the industrial device based on the data about the industrial device from the local catalog.

DETAILED DESCRIPTION

In the following detailed description of certain embodiments, reference is made to the accompanying drawings which form a part hereof, and in which are shown by way of illustration of example embodiments. It is also to be understood that features of the embodiments and examples herein can be combined, exchanged, or removed, other embodiments may be utilized or created, and structural changes may be made without departing from the scope of the present disclosure.

In accordance with various embodiments, the methods and functions described herein may be implemented as one or more software programs running on a computer processor or controller. Dedicated hardware implementations including, but not limited to, application specific integrated circuits, programmable logic arrays, and other hardware devices can likewise be constructed to implement the methods and functions described herein. Methods and functions may be performed by modules or nodes, which may include one or more physical components of a computing device (e.g., logic, circuits, processors, etc.) configured to perform a particular task or job, or may include instructions that, when executed, can cause a processor to perform a particular task or job, or any combination thereof. Further, the methods described herein may be implemented as a computer readable storage medium or memory device including instructions that, when executed, cause a processor to perform the methods.

Figure 1:
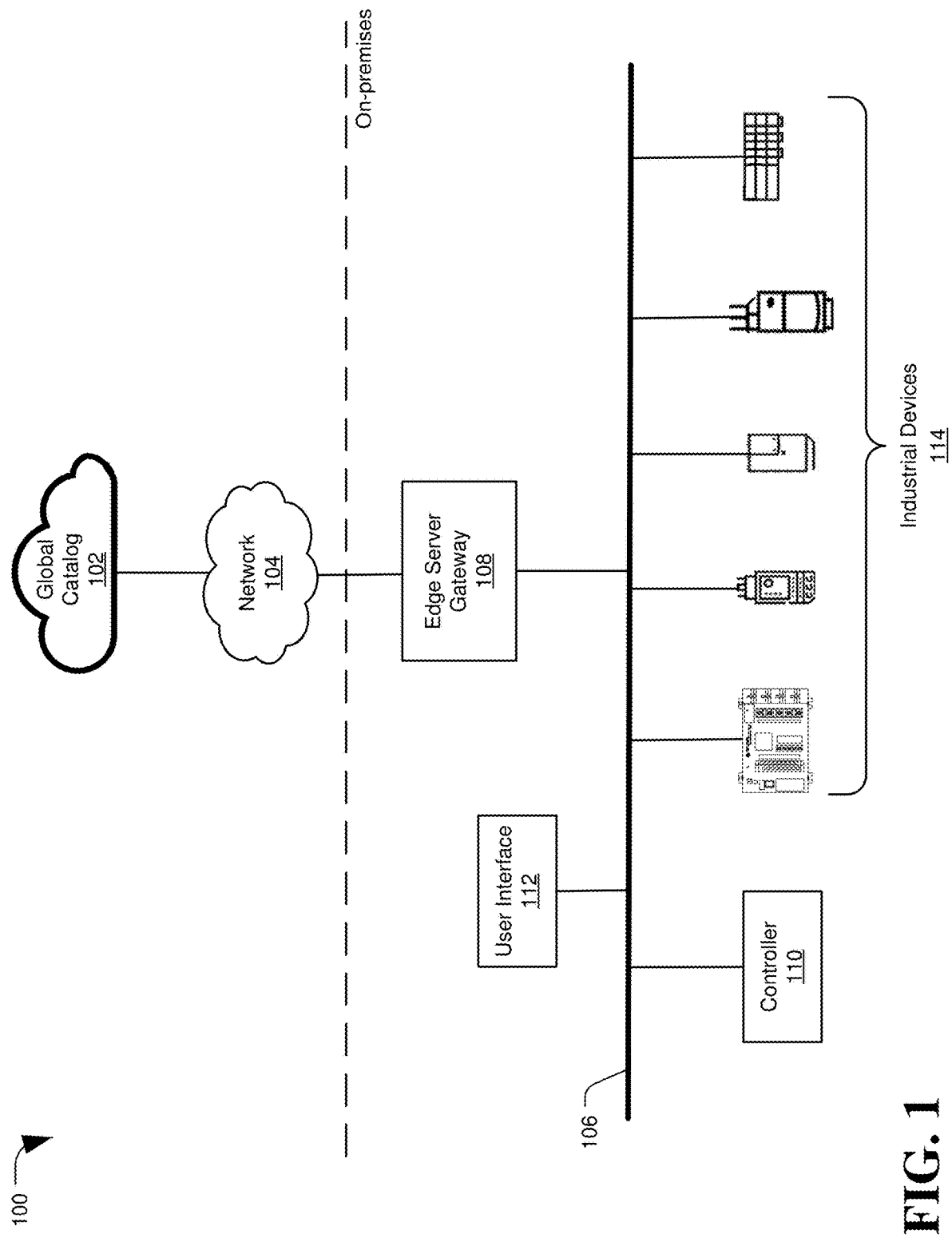
FIG. 1 is a diagram of a system configured to perform a local update from a global catalog of device and system attributes, in accordance with certain embodiments of the present disclosure.

FIG. 1 depicts a diagram of a system 100 configured to perform a local update from a global catalog of device and system attributes, in accordance with certain embodiments of the present disclosure. The system 100 may include a cloud-based global catalog 102, a wide-area network 104 such as the internet, and a number of on-premises components of an industrial automation environment. The on-premises components may include a local network 106, to which may be connected an edge server 108, a controller 110, a user interface 112, and a plurality of industrial devices or equipment 114. Elements of system 100 may be implemented via computers, servers, hardware and software modules, drives, motors, sensors, relays, or other system components. Elements of system 100 may also include or have access to one or more data storage devices, data storage mediums, data storage servers, and related data structures such as databases, which may store data files and related metadata.

The premises may comprise an industrial plant environment or other industrial environment. Elements within the industrial environment may connect to a local network 106, such as a local area network (LAN), which may be implemented as an EtherNet/IP (industrial protocol) network or other form of network. Local network 106 may include one or more wired or wireless networks (e.g., an office network and a factory network for a company or enterprise). The local network 106 may be connected to a wide area network (WAN) 104, such as the internet, via an edge server or gateway 108.

One or more controllers 110 may be deployed within the environment to monitor and control respective industrial devices and systems 114, in order to implement processes relating to product manufacture, machining, motion control, batch processing, material handling, or other industrial functions. Industrial controllers 110 may execute control programs or applications to facilitate monitoring and control of industrial devices 114, either through a direct or wired connection or via local network 106. Controller 110 may comprise a computing device or server (e.g., such as a programmable logic controller, or PLC) and associated executable code or applications, or it may comprise a software module executed on a personal computer, smart phone, or other hardware platform, or on a cloud platform. The control programs executed by controller 110 can include any type of executable instructions capable of processing input signals read from the industrial devices 114 and controlling output signals generated by the industrial controllers 110, including but not limited to ladder logic, sequential function charts, function block diagrams, or structured text.

A user interface 112 may be used to control or interface with controller 110, industrial devices 114, edge server 108, or other assets within the industrial environment. User interface 112 may comprise an application or software module configured to provide a visual interface (e.g., a graphical user interface, or GUI) on another device such as a tablet, smart phone, or personal computer, and in some embodiments it may be integrated into another physical device such as controller 110, one or more industrial devices 114, edge server 108, another interface terminal, or any combination of elements. User interface 112 may include physical input elements such as a touch screen, pointer device, keyboard, switches, dials, microphone, speaker, or other input/output (I/O) components.

Industrial devices 114 may include various types of industrial and commercial devices that may be used to perform respective processes in operating environment 100. For example, industrial devices 114 may include one or more of variable-speed drives, motors, conveyer belts, circuit devices, programmable logic controllers (PLCs) (e.g., controller 110), relays, sensors, and more. Various components of industrial devices 114 may be coupled together via wired or wireless connections, such as through local network 106. In some examples, controller 110 or user interface/application 112 may execute control programs to direct the operation of industrial devices 114, for example in an orchestrated manner causing multiple devices (e.g., conveyors, dispensers, drives or motors, etc.) to operate together to produce a desired industrial product or outcome. Various industrial devices 114 may also interface or communicate with other industrial devices to efficiently work together as part of an industrial process, performance or maintenance monitoring, or for other purposes.

As described herein, various controllers 110, user interfaces 112, applications, and industrial devices may be integrated into an industrial automation environment 100. Various components may be added or removed to the environment, and the logical or physical arrangement of components may be adjusted or changed. Various components may utilize different interface formats, data formats, communication standards, physical interconnects, operating systems or software, or other attributes. Workers may need access to these details when designing and assembling an automation system, or maintaining or updating components. Similarly, applications and software within the industrial environment may utilize device, system, and software attributes, properties, profiles, schematics, etc. to inform how components of the industrial environment are interoperable and interact.

Technical details, attributes, profiles, schematics, etc. for all potential components a device or application may interface with could be pre-loaded with each piece of equipment or application. However, the volume of data for all possible interactions may be enormous, and the list of potential components may be updated and expand over time.

Instead, relevant technical details may be hosted at a global catalog 102. Global catalog 102 may comprise one or more cloud servers, where data storage constraints are not a serious obstacle. The global catalog 102 may host a wide amalgamation of data from a plethora of data sources, and may be updated with new technical details, patches, security notes, and other details. Applications or components from local network 106 could query the global catalog 102 for a subset of the data that is of value for their specific use, via wide area network 104. However, various components may query for the same data, or coordinating data access or usage among components of local network 106 may be complicated.

Instead, a local catalog of relevant information may be implemented at a gateway edge server 108 between local network 106 and wide area network 104. The edge server 108 may provide compute and other resources that applications and devices within network 106 need to run. The edge server 108 may fulfill this purpose as close to the applications, and the people or machines using those applications, as possible. In some examples, the edge server 108 may be configured to determine components of the local network 106, and may query the global catalog 102 for data relevant to the discovered components. The edge server 108 may store the data received from the global catalog 102 into a local catalog. Further, the edge server 108 may periodically check for updates to the global catalog 102 relevant to components of the local network 106. Data in the local catalog may be accessed by components within the industrial environment via local network 106, and in some examples the edge server may push relevant data to relevant components of network 106. An example embodiment of system 100 is described in more detail in regard to FIG. 2.

Figure 2:
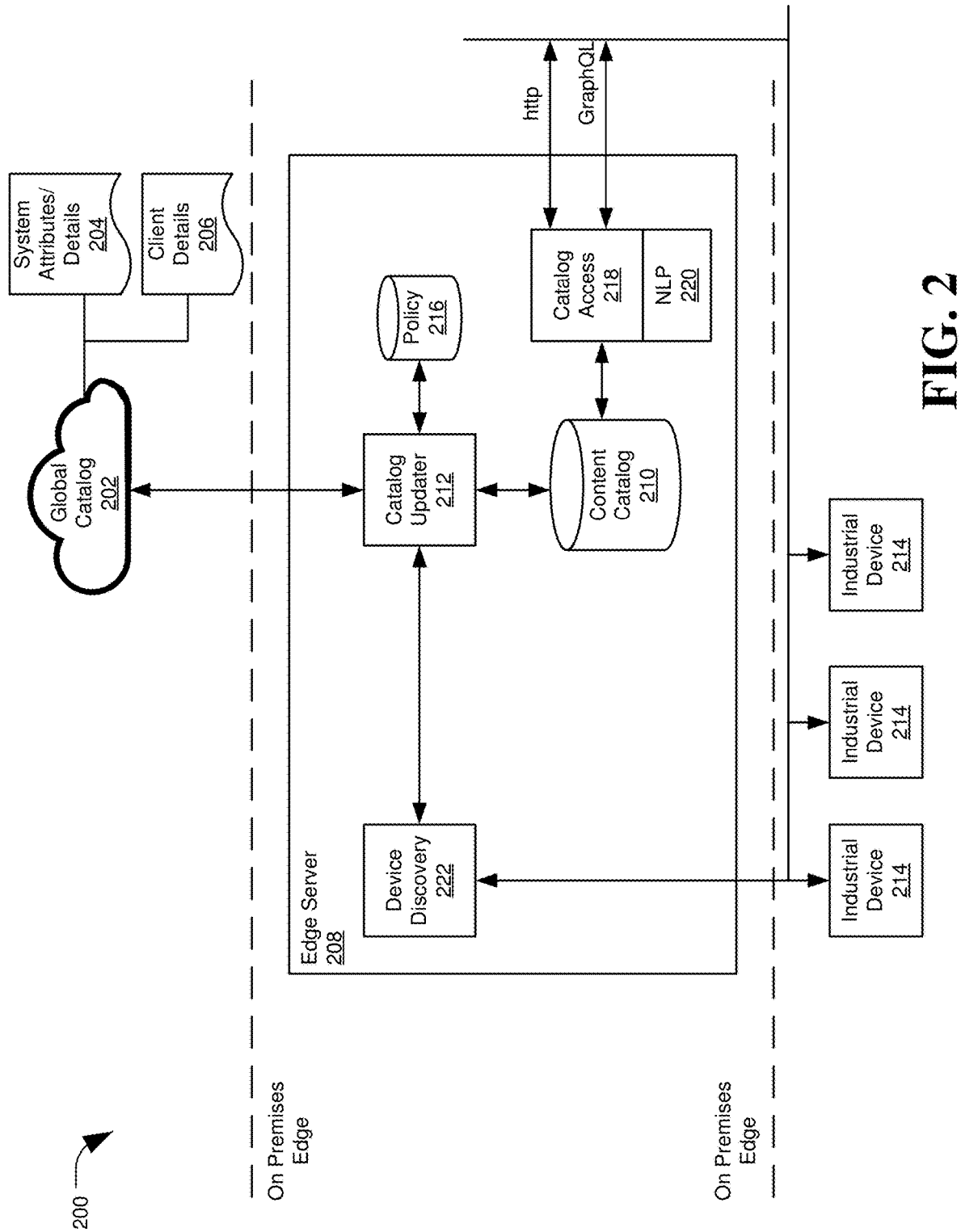
FIG. 2 is a diagram of a system configured to perform a local update from a global catalog of device and system attributes, in accordance with certain embodiments of the present disclosure.

FIG. 2 depicts a diagram of a system 200 configured to perform a local update from a global catalog of device and system attributes, in accordance with certain embodiments of the present disclosure. In particular, system 200 provides additional detail on an edge server 208 configured to manage a local catalog of technical details for use in an industrial environment. The system 200 may include a cloud-based global catalog 202, the edge server 208, and a plurality of industrial devices 214. The components may communicate via wide area network 104 and local area network 106 as described in regard to FIG. 1.

Global catalog 202 may include one or more servers hosting a database or data catalog storing attributes, properties, profiles, schematics, security notices or updates, and other details 204 for industrial equipment and applications. Example types of industrial system data 204 which can be indexed by the catalog system 202 can include, but are not limited to, electronic data sheet (EDS) files corresponding to respective industrial devices, device profiles, device type modules, electronic document delivery (EDD) files, spreadsheet files or word processing documents containing product information, portable document format (PDF) files, or other such data types or file types. An example of a global catalog 202 is described in U.S. patent application Ser. No. 17/813,085, entitled "Catalog Service Replication", filed Jul. 18, 2022, the contents of which are incorporated herein by reference.

In addition to system attributes and details 204, the global catalog 202 may store client details 206, which may include a listing or topology information for industrial devices and applications 214 at an industrial environment (e.g., at a factory, warehouse, or other location where an industrial automation system is employed). The global catalog may receive details on components in an industrial system from edge server 208. In some examples, the global catalog may use the client details to determine which system attributes and details 204 are relevant to the client system, and may push updates on those details to the client (e.g., by sending updates or notices to edge server 208).

Edge server 208 may include one or more servers, processors, and software modules deployed as an on-premises edge system for an industrial automation environment. The edge server 208 may include a local content catalog 210, a catalog updater module 212 and associated update policy 216, a catalog access module 218 and associated natural language processing (NLP) module 220, and a device discovery module 222.

The device discovery module 222 may perform an operation to functionally "walk" a local network of the industrial environment to discover industrial devices 214 connected to the network. For example, the device discovery module 222 may query devices or addresses on the network to detect common industrial protocol (CIP) devices, including industrial devices 214 such as drives, motors, sensors, controllers, applications, or other components. In response to the discovery query, an industrial device 214 may provide attributes about itself, such as a device identity or other unique identifier (UID), operating software version number, connected devices, or other details. The device discovery module 222 may provide the attributes received from an industrial device 214 to catalog updater 212, which may use the information to look up the device or device ID in the content catalog 210.

For devices 214 that are already recognized or known to be part of the industrial network, the content catalog 210 may store various details and attributes about each device, such as a type of device, amount of memory or other specifications, schematic drawings, or other details. When a device 214 already has details stored to the content catalog 210, the catalog updater may take no action, or may check if any of the discovered attributes have changed relative to what is recorded in the content catalog 210, and may update the details accordingly. For a newly discovered or added industrial device 214, the content catalog 210 may indicate no information is stored, or information is missing. The catalog updater may assign a node identifier and add the device, along with the device attributes, to a list or topology data for the industrial environment stored at the content catalog 210. Further, the catalog updater may provide new device or topology data for the industrial environment to the global catalog 202, so the global catalog can update the client details 206 for the corresponding client or industrial environment.

The catalog updater may also check the global catalog 202 for system attributes and details 204 for data relevant to industrial devices 214 discovered by the device discovery module 222. In particular, the catalog updater 212 may check for relevant data that is not already stored to the local content catalog 210. For example, newly discovered devices may need to have all relevant data updated in the content catalog 210, while the catalog updater 212 may check for updates to the data for previously known or existing industrial devices 214. Updates may come in the form of security updates, software patches, or other changes to the data for a device itself, or may include data on how an existing device 214 may interface with a newly discovered device 214 within the industrial environment. Data that the catalog updater 212 obtains from the global catalog 202 may be added to or updated in the local content catalog 210 for use within the industrial environment.

The operations of catalog updater 212, and potentially other operations of edge server 208, may be controlled by a catalog update policy 216. The policy 216 may be a preconfigured set of operations for the edge server 208 to follow, or parts or all of the policy may be configured by a user or system administrator for the industrial environment. In some examples, the policy 216 may control how often to perform device discovery, how often to check the global catalog 202 for updates, or the types of data to store to content catalog 210 or check for in global catalog 202. For example, some data on an industrial device 214 may be available in global catalog 202, but may not be considered relevant or important to store locally at content catalog 210, such as previous operating system (OS) versions, ordering or purchasing details, or other information. In some embodiments, example processes for data updating and query handling at a local catalog 210, as described in regard to FIGS. 3 and 4, may be performed according to policy 216.

Queries or access operations to the local content catalog 210, for example from an industrial device 214 or application on a local network of an industrial environment, may be handled via a catalog access module 218. The catalog access module 218 may be configured to receive data access requests in one or more data formats, and determine which data to retrieve and return from content catalog 210. For example, a query may be received via an application program interface (API) format such as GraphQL, via hypertext transfer protocol (HTTP) requests, file transfer protocol (FTP), or other formats. In some examples, the catalog access module 218 may handle access requests for different kinds of content differently. For example, content that may be of general interest or availability to many clients (e.g., manuals or drawings for devices) may be handled via a first format or access method, while more particular or specialized data (e.g., proprietary or restricted data, or icons or high quality images for tools to use when representing the device on a display) may be handled via a different format or access method, such as requiring different permission levels. If requested data is not located within the local content catalog 210, the catalog updater 212 may query the global catalog 202 to determine if the requested data is available there. If so, the catalog updater may return the requested data (e.g., via catalog access module 218), and may optionally update the content catalog 210, depending on policy settings 216. For example, all requested data may be considered valid for storage at the content catalog 210. However, in some embodiments certain requests may be considered to be for data that is not relevant enough to persistently store in the local content catalog 210, such as requests for data not related to components of the local industrial environment.

The catalog access module 218 may also include a natural language processing (NLP) module 220. In some examples, the NLP module 220 may be configured to process natural language queries (e.g., questions phrased in English sentences) received at the catalog access module 218, and convert them into a machine-recognized query format for accessing the content catalog 210 or the global catalog 202. The NLP module 220 may be in the form of a bot for providing responses to human queries. For example, a user may ask "how do I set the IP address for a 156E water pump?", and the NLP module 220 may determine how to query the content catalog 210 for this data (e.g., by looking up the manual for the proper equipment, and index one or more relevant passages). The NLP module 220 may then construct a response answering the question, and in a natural language format that a human can understand. The NLP module 220 may be configured to process text inputs, verbal or audio inputs, or both.

The NLP module 220 may also be configured to monitor inputs on the local network that are not presented as a query to the content catalog 210, and provide useful feedback based on information in the content catalog 210. For example, a user may be using a design tool application writing code for an industrial device 214, the NLP module 220 may access the content catalog 210 for the device and suggest that the user employ a more updated code module that the device supports. In this way, the content catalog 210 may be a repository of information that the NLP 220 may use to assist users or applications within the industrial system.

The NLP module 220 may be implemented using one or more AI algorithms configured to process natural language, high-level computer code, or similar inputs, and to be able to draw logical connections between the inputs and data in the content catalog 210. To facilitate processing by an NLP module 220, data in the content catalog 210 may be added to a vector or embeddings database, putting the data into a representation that includes semantic information usable by AI to gain understanding of the data. The data may be put into the vector or embeddings format at the local content catalog 210, at the global catalog 202, or both. In some examples, the NLP module 220, or the AI processing portion, may be located at the global catalog 202 instead of at the edge server 208, or various processes may be distributed between local and global locations.

Figure 3:
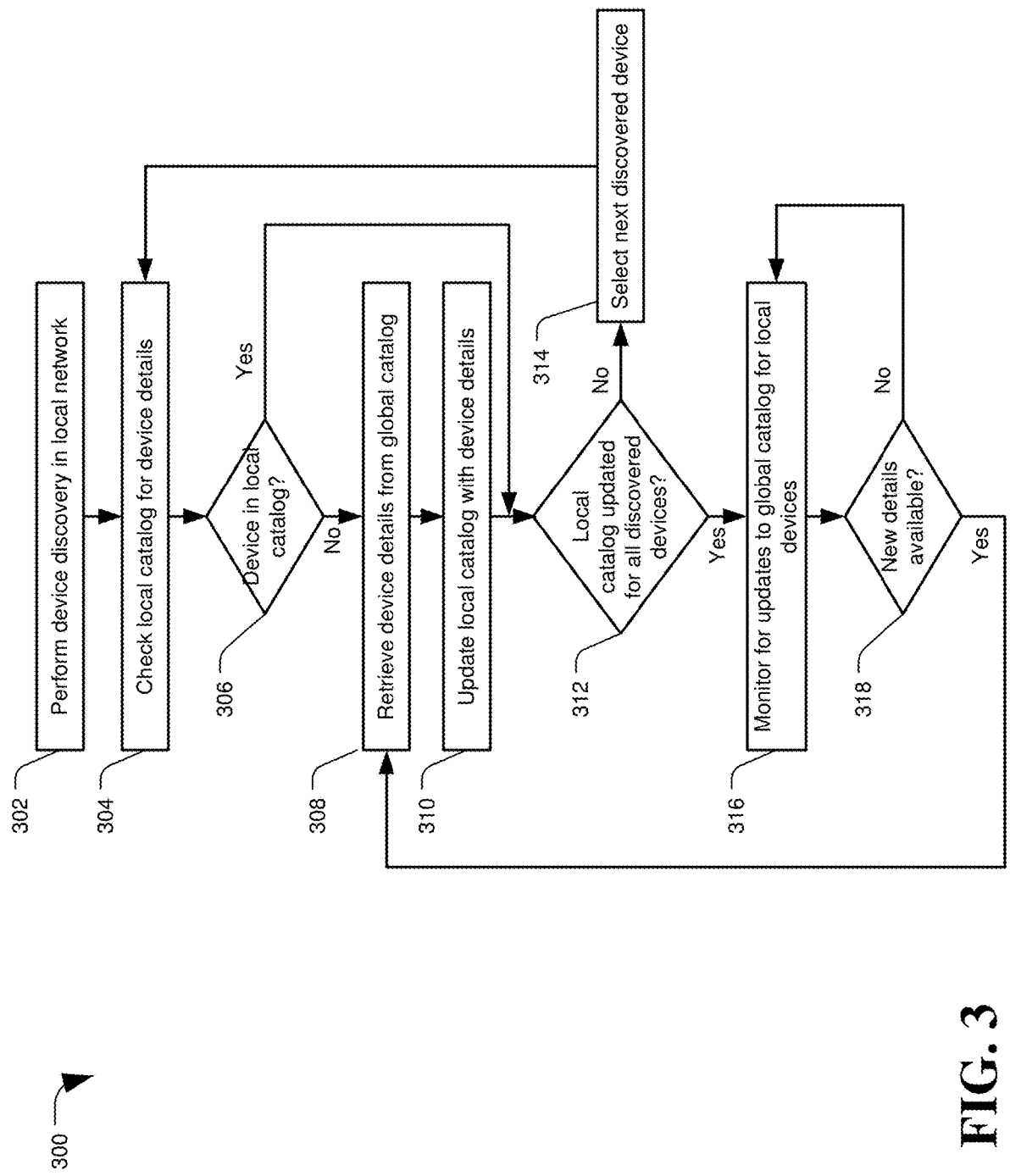
FIG. 3 is a flowchart of an example method for performing a local update from a global catalog of device and system attributes, in accordance with certain embodiments of the present disclosure.

Turning now to FIG. 3, a flowchart 300 of an example method for performing a local update from a global catalog of device and system attributes is shown, in accordance with certain embodiments of the present disclosure. In particular, FIG. 3 may depict an example method for updating a local catalog for devices and applications discovered within a local network in an industrial environment. The method may be implemented by an edge server or gateway device, such as edge server 108 of FIG. 1 or 208 of FIG. 2.

The method may include performing device discovery in a local network, at 302. Device discovery may include walking a network and discovering device identifiers for industrial equipment, and potentially other computing systems and applications. At 304, the method may include checking a local catalog for discovered device, such as determining whether a device having a matching identifier is in the catalog, and if system attributes and details for the device are stored to the catalog.

A determination may be made whether the device is in the local catalog, at 306. If not, the method may include retrieving device details for the discovered device identifier from a global catalog, at 308. The global catalog may be a cloud resource remote from the local network or industrial environment. In some examples, the method may also include providing the newly discovered device identifier to the global catalog, so that the global catalog can maintain a file or log of devices within the local industrial environment. Details obtained from the global catalog may be used to update the local catalog, at 310.

Once a determination is made that the local catalog include data for the discovered device, at 306, or when data for the device has been obtained from the global catalog, at 310, the method may include determining whether the local catalog is up to date for all discovered device, at 312. If not, the method may include selecting a next discovered device, at 314, and checking the local catalog for the device's details, at 304.

When the local catalog is updated for all discovered devices, the method may include monitoring for updates to the global catalog for local devices, at 316. For example, the global catalog may receive or obtain updates regarding industrial devices and related technical details. The global catalog may maintain a list or topology of devices within a client's industrial environment, and may push out notifications to the edge server when an update is received at the global catalog for a device relevant to the client. In another example, the edge server may routinely or automatically check the global catalog for any updates to devices within the local industrial environment (e.g., by checking a time updated tag for relevant files relative to a previous update check). A determination may be made whether new details are available at the global catalog, at 318. If not, the method may include continuing to monitor for updates, at 316. If new data is available, the method may include retrieving the new device details from the global catalog, at 308. An example method of querying the local catalog for data is described in regard to FIG. 4.

Figure 4:
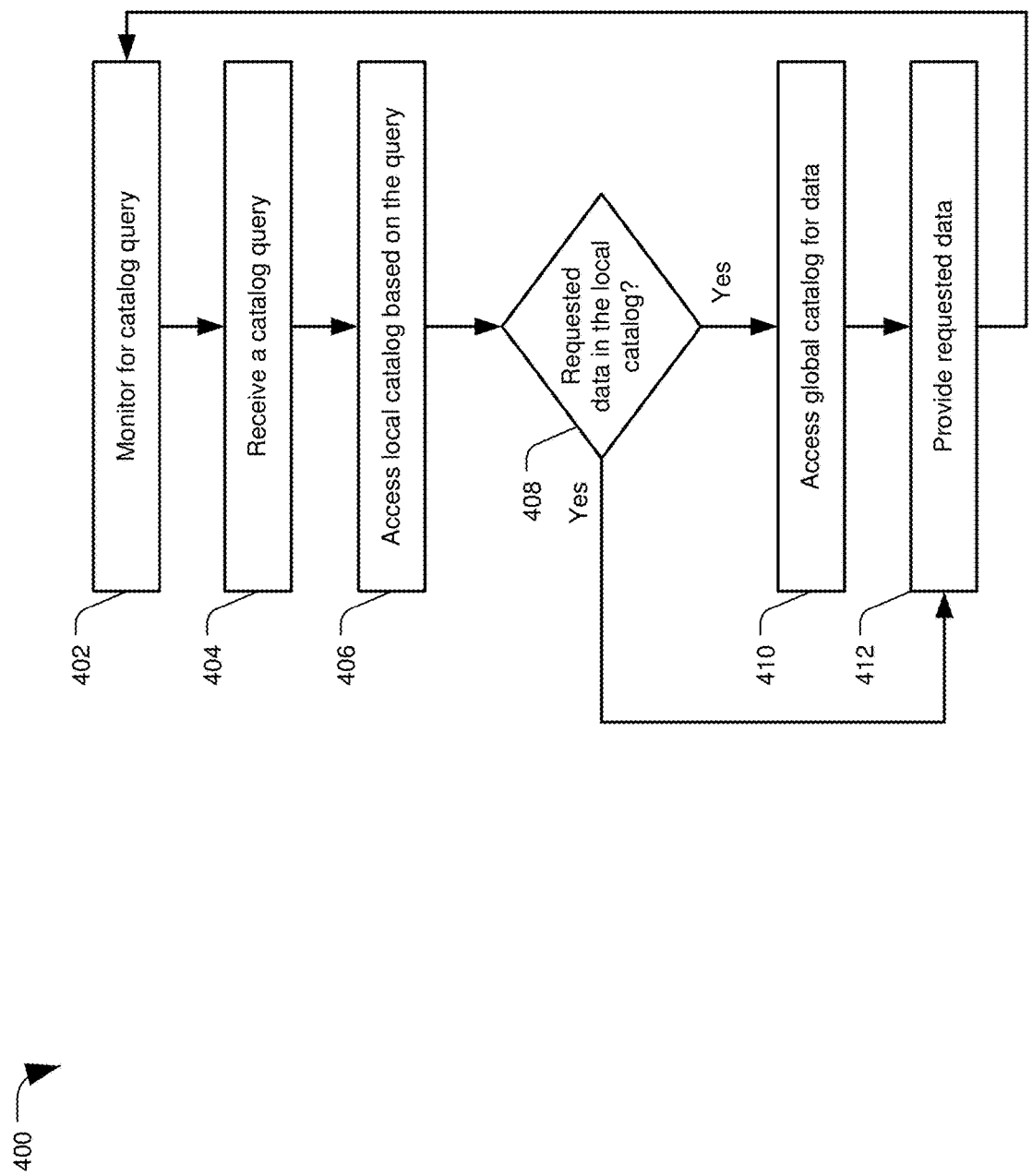
FIG. 4 is a flowchart of an example method for performing a local update from a global catalog of device and system attributes, in accordance with certain embodiments of the present disclosure.

FIG. 4 depicts a flowchart 400 of an example method for performing a local update from a global catalog of device and system attributes, in accordance with certain embodiments of the present disclosure. In particular, FIG. 4 may depict an example method for handling queries to a local catalog of an industrial automation system. The method may be implemented by an edge server or gateway device, such as edge server 108 of FIG. 1 or 208 of FIG. 2.

The method may include monitoring for a catalog query, at 402. A catalog query may include a specific query received through an API or other web-based interface, or a query may be in the form of an incidental query arising from other activity on the local industrial network. For example, a specific query may include a structured database query submitted through a GraphQL API, or the query may be a natural language query presented to the system through a text or voice interface. An incidental query may arise when a monitoring module or bot identifies activity within an application (such as text or code being written), and accesses a catalog to determine whether information in the catalog may be used to improve the user experience or productivity associated with the activity (such as by recommending changes or efficiency improvements).

The method may include receiving a catalog query, at 404, and performing any associated query parsing or format conversion necessary to access a catalog based on the query. The query may come from a user (e.g., via a user interface of an application or device), or it may be generated by an application, controller, or device automatically to facilitate some process or operation. At 406, the method may include accessing a local catalog based on the query. The local catalog may be stored or located on-premises for an industrial environment, such as a factory or industrial plant.

A determination may be made whether the requested data is available in the local catalog, at 408. If so, the requested data may be retrieved, and provided in response to the query, at 412. Providing the response may include converting, modifying, or otherwise processing the data into a format suitable for review by the requesting user or system. For example, for natural language processing and AI-based evaluation of text or code being entered into an application, providing the requested data may include formulating a natural language sentence suggesting use of the data at a user interface.

If the requested data is not in the local catalog, at 408, the method may include accessing a remote global catalog for the requested data, at 410. The global catalog may be situated in the cloud or on an off-premises server from the industrial environment, and may be accessed via a wide area network. The global catalog may retain a greater volume of data than is available at the local catalog. Data unavailable in the local catalog may be accessible from the global catalog, with a copy of the data potentially being copied from the global catalog to the local catalog in response to the requested data not being available in the local catalog. When the requested data has been retrieved from the global catalog, it may be provided in response to the query, at 412. Once data has been returned in response to a query, the method may include continuing to monitor for additional catalog queries, at 402. A system for use in performing a local update from a global catalog of device and system attributes is described in regard to FIG. 5.

Figure 5:
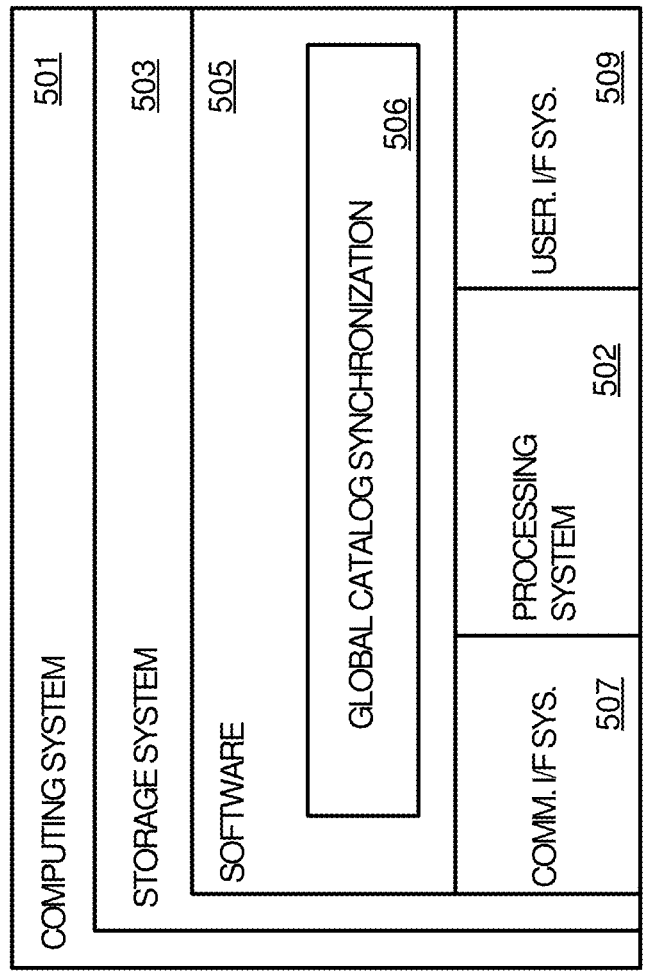
FIG. 5 is a diagram of a system configured to perform a local update from a global catalog of device and system attributes, in accordance with certain embodiments of the present disclosure.

FIG. 5 illustrates an apparatus 500 configured to perform a local update from a global catalog of device and system attributes, in accordance with certain embodiments of the present disclosure. The apparatus 500 may include a computing system 501 that is representative of any system or collection of systems in which the various processes, systems, programs, services, and scenarios disclosed herein may be implemented. For example, computing system 501 may be an example of edge server 108, global catalog 102, network 104, user interface 112, controller 110, or industrial devices 114 of FIG. 1. Examples of computing system 501 include, but are not limited to, server computers, desktop computers, laptop computers, routers, web servers, cloud computing platforms, and data center equipment, as well as any other type of physical or virtual server machine, physical or virtual router, container, communications network equipment, and any variation or combination thereof.

Computing system 501 may be implemented as a single apparatus, system, or device or may be implemented in a distributed manner as multiple apparatuses, systems, or devices. Computing system 501 may include, but is not limited to, processing system 502, storage system 503, software 505, communication interface system 507, and user interface system 509. Processing system 502 may be operatively coupled with storage system 503, communication interface system 507, and user interface system 509.

Processing system 502 may load and execute software 505 from storage system 503. Software 505 may include and implement a global catalog synchronization process 506, which may be representative of any of the operations for discovering industrial devices, checking for device and system attributes and data availability at a local catalog, receiving and processing queries, and accessing a global catalog for answering queries and synchronizing data at the local catalog, as discussed with respect to the preceding figures. When executed by processing system 502 to perform global catalog synchronization, software 505 may direct processing system 502 to operate as described herein for at least the various processes, operational scenarios, and sequences discussed in the foregoing implementations. Computing system 501 may optionally include additional devices, features, or functionality not discussed for purposes of brevity.

In some embodiments, processing system 502 may comprise a micro-processor and other circuitry that retrieves and executes software 505 from storage system 503. Processing system 502 may be implemented within a single processing device but may also be distributed across multiple processing devices or sub-systems that cooperate in executing program instructions. Examples of processing system 502 may include general purpose central processing units, graphical processing units, application specific processors, and logic devices, as well as any other type of processing device, combinations, or variations thereof.

Storage system 503 may comprise any memory device or computer readable storage media readable by processing system 502 and capable of storing software 505. Storage system 503 may include volatile and nonvolatile, removable and non-removable media implemented in any method or technology for storage of information, such as computer readable instructions, data structures, program modules, or other data. Examples of storage media include random access memory, read only memory, magnetic disks, optical disks, optical media, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 503 may also include computer readable communication media over which at least some of software 505 may be communicated internally or externally. Storage system 503 may be implemented as a single storage device but may also be implemented across multiple storage devices or sub-systems co-located or distributed relative to each other. Storage system 503 may comprise additional elements, such as a controller, capable of communicating with processing system 502 or possibly other systems.

Software 505 (including global catalog synchronization process 506 among other functions) may be implemented in program instructions that may, when executed by processing system 502, direct processing system 502 to operate as described with respect to the various operational scenarios, sequences, and processes illustrated herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 505 may include additional processes, programs, or components, such as operating system software, virtualization software, or other application software. Software 505 may also comprise firmware or some other form of machine-readable processing instructions executable by processing system 502.

In general, software 505 may, when loaded into processing system 502 and executed, transform a suitable apparatus, system, or device (of which computing system 501 is representative) overall from a general-purpose computing system into a special-purpose computing system customized to implement the systems and processes as described herein. Indeed, encoding software 505 on storage system 503 may transform the physical structure of storage system 503. The specific transformation of the physical structure may depend on various factors in different implementations of this description. Examples of such factors may include, but are not limited to, the technology used to implement the storage media of storage system 503 and whether the computer-storage media are characterized as primary or secondary storage, as well as other factors.

For example, if the computer readable storage media are implemented as semiconductor-based memory, software 505 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 507 may include communication connections and devices that allow for communication with other computing systems (not shown) over communication networks (not shown). Examples of connections and devices that together allow for inter-system communication may include network interface cards, antennas, power amplifiers, radio-frequency (RF) circuitry, transceivers, and other communication circuitry. The connections and devices may communicate over communication media to exchange communications with other computing systems or networks of systems, such as metal, glass, air, or any other suitable communication media.

Communication between computing system 501 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above embodiments, and other embodiments not specifically described herein, will be apparent to those of skill in the art upon reviewing the description. Steps depicted in the flowcharts may optionally be excluded, added, performed in a different order, or performed with different degrees of concurrency than shown (e.g., steps depicted as sequential may be performed concurrently). Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:
1. A system comprising:
a physical edge server in a local network of an industrial automation environment, configured to update a local catalog from a cloud-based global catalog, including:
perform a device discovery operation to identify common industrial protocol (CIP) devices connected to the local network on premises with the physical edge server, wherein the device discovery operation comprises transmitting a discovery query to addresses on the local network;

determine that the local catalog does not include data for an industrial device of the identified CIP devices;

access, in response to the determination, the cloud-based global catalog to obtain data about the industrial device;

store the data about the industrial device to the local catalog; and respond to an information query about the industrial device based on the data about the industrial device from the local catalog.

2. The system of claim 1, wherein the device discovery operation further comprises:

receiving, from the CIP device, device identity attributes associated with the respective CIP device, wherein the device identity attributes comprise one or more of:
a unique identifier (UID) for the CIP device, and
an operating software version number for the CIP device.

3. The system of claim 1, wherein the physical edge server is further configured to:

add the industrial device to a list of systems connected to the local network;

determine whether the global catalog includes updated data for systems on the list of systems relative to the local network; and when the global catalog includes updated data, update the local catalog to include the updated data.

4. The system of claim 3, wherein the physical edge server is further configured to:

provide the global catalog with information regarding the list of systems connected to the local network; and wherein the physical edge server is configured to determine the global catalog includes updated data when the physical edge server receives a notification from the global catalog regarding a data update for a system from the list of systems.

5. The system of claim 3 wherein determining whether the global catalog includes updated data includes:

perform a search of the global catalog for data related to systems on the list of systems; and determine the global catalog includes updated data when data related to the list of systems is more recent than data contained in the local catalog.

6. The system of claim 3, wherein the physical edge server is further configured to:

monitor for a catalog query from the local network for requested data;

determine whether the local catalog contains the requested data based on the catalog query;

when the local catalog does contain the requested data, provide the requested data from the local catalog;

when the local catalog does not contain the requested data, obtain the requested data from the global catalog; and update the local catalog with the requested data.

7. The system of claim 6 wherein monitoring for a catalog query includes:

apply natural language processing to a user input; and utilize an artificial intelligence (AI) algorithm to determine useful data from at least one of the global catalog and the local catalog to present in response to the user input.

8. The system of claim 1, wherein the local catalog is disposed in the physical edge server and is accessible by the CIP devices in the local network.

9. The system of claim 1, wherein the obtained data comprises one or more of: an electronic data sheet file associated with the industrial device, a device profile associated with the industrial device, a device type module associated with the industrial device, and documents containing product information about the industrial device.

10. The system of claim 6 further comprising the local network includes an EtherNet/IP (industrial protocol) network.

11. A method comprising:

updating a local catalog from a cloud-based global catalog via an edge server in a local network of an industrial automation environment, including:

performing a device discovery operation to identify common industrial protocol (CIP) devices connected to the local network on premises with the edge server, wherein the device discovery operation comprises transmitting a discovery query to addresses on the local network;

determining that the local catalog does not include data for an industrial device of the identified CIP devices;

accessing, in response to the determination, the cloud-based global catalog to obtain data about the industrial device;

storing the data about the industrial device to the local catalog; and responding to an information query about the industrial device based on the data about the industrial device from the local catalog.

12. The method of claim 11, wherein the device discovery operation further comprises:

receiving, from the CIP device, device identity attributes associated with the respective CIP device, wherein the device identity attributes comprise one or more of:
a unique identifier (UID) for the CIP device, and
an operating software version number for the CIP device.

13. The method of claim 11 further comprising:

adding the industrial device to a list of systems connected to the local network;

determining whether the global catalog includes updated data for systems on the list of systems relative to the local network; and when the global catalog includes updated data, updating the local catalog to include the updated data.

14. The method of claim 13 further comprising:

providing the global catalog with information regarding the list of systems connected to the local network; and determining the global catalog includes updated data when the edge server receives a notification from the global catalog regarding a data update for a system from the list of systems.

15. The method of claim 13 further comprising:

performing a search of the global catalog for data related to systems on the list of systems; and determining the global catalog includes updated data when data from the global catalog related to the list of systems is more recent than data contained in the local catalog.

16. The method of claim 11 further comprising:

monitoring for a catalog query from the local network for requested data;

determining whether the local catalog contains the requested data based on the catalog query;

when the local catalog does contain the requested data, providing the requested data from the local catalog;

when the local catalog does not contain the requested data, obtaining the requested data from the global catalog; and updating the local catalog with the requested data.

17. The method of claim 16 further comprising:
monitoring for a catalog query including user input from the local network;
applying natural language processing to the user input; and
utilizing an artificial intelligence (AI) algorithm to determine useful data from at least one of the global catalog and the local catalog to present in response to the user input, wherein data from the at least one of the global catalog and the local catalog is available in an embeddings format for use in AI processing.

18. A memory device storing instructions that, when executed, cause a processor to perform a method comprising:
updating a local catalog from a cloud-based global catalog via an edge server in a local network of an industrial automation environment, including:
performing a device discovery operation to identify common industrial protocol (CIP) devices connected to the local network on premises with the edge server, wherein the device discovery operation comprises transmitting a discovery query to addresses on the local network;
in response to identifying the CIP devices during the device discovery operation, accessing the local catalog to determine whether data about an industrial device, of the CIP devices, is already stored in the local catalog;
accessing the global catalog to obtain the data about the industrial device based on the data about the industrial device not being stored in the local catalog;
storing the data about the industrial device to the local catalog; and
responding to an information query about the industrial device based on the data about the industrial device from the local catalog.

19. The memory device of claim 18 storing instructions that, when executed, cause the processor to perform the method further comprising:
adding the industrial device to a list of systems connected to the local network;
determining whether the global catalog includes updated data for systems on the list of systems relative to the local network; and
when the global catalog includes updated data, updating the local catalog to include the updated data.

20. The memory device of claim 18 storing instructions that, when executed, cause the processor to perform the method further comprising:
monitoring for a catalog query from the local network for requested data;
determining whether the local catalog contains the requested data based on the catalog query;
when the local catalog does contain the requested data, providing the requested data from the local catalog;
when the local catalog does not contain the requested data, obtaining the requested data from the global catalog; and
updating the local catalog with the requested data.

* * * * *